US007401298B1

(12) United States Patent
Sexton et al.

(10) Patent No.: US 7,401,298 B1
(45) Date of Patent: Jul. 15, 2008

(54) STREAMING ALGORITHM THAT POPULATES USER INFORMATION FROM DATABASE BASED ON SCROLLING ACTIVITY

(75) Inventors: John Sexton, Grenagh (IE); Cathal O'Donovan, Cork (IE); David Barta, West Roxbury, MA (US); Michael P. Bushe, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 724 days.

(21) Appl. No.: 10/335,591

(22) Filed: Dec. 31, 2002

(51) Int. Cl.
*G06F 3/048* (2006.01)
(52) U.S. Cl. .................. 715/786; 715/784; 715/973
(58) Field of Classification Search .......... 715/784, 715/786, 973
See application file for complete search history.

(56) References Cited
U.S. PATENT DOCUMENTS 5,418,549 A * 5/1995 Anderson et al. ........... 715/786
6,204,846 B1 * 3/2001 Little et al. ................. 715/784
6,518,984 B1 * 2/2003 Maeckel et al. ............. 715/786

* cited by examiner

*Primary Examiner*—Sy D. Luu
*Assistant Examiner*—Sajeda Muhebbullah
(74) *Attorney, Agent, or Firm*—Muirhead and Saturnelli, LLC (57) ABSTRACT

Displaying requested data from a database includes providing a display containing a scroll bar with a scroll tab therein, determining a total amount of the requested data, sizing the scroll tab in the scroll bar according to the total amount of the requested data and according to an amount of data displayable in the display, and fetching a predetermined amount of data from a first portion of the database. The predetermined amount may be independent of the size of the display. The predetermined amount may be less than the total amount of the requested data. Sizing the scroll tab may include choosing a size that indicates to a user that all of the requested data is being fetched from the database and/or may include choosing a size that is inversely proportional to the total amount of the request data in response to the total amount of the requested data being less than a predetermined value. Choosing a size may include choosing a predetermined size in response to the total amount of the requested data being greater than the predetermined value.

24 Claims, 8 Drawing Sheets

STREAMING ALGORITHM THAT POPULATES USER INFORMATION FROM DATABASE BASED ON SCROLLING ACTIVITY

BACKGROUND OF THE INVENTION

1. Technical Field

This application relates to the field of computer storage devices, and more particularly to the field displaying information related to a plurality of storage devices coupled to a plurality of hosts in a storage area network.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may nor correspond to the actual disk drives. Allowing multiple host systems to access the single storage device unit allows the host systems to share data stored therein.

A large system may consist of a plurality of hosts, a plurality of storage devices, and a plurality of switches that direct data between the hosts and the storage devices. Such a system, called a storage area network (SAN), provides for certain efficiencies and optimizations when the storage devices and hosts are used together. However, it may be difficult to monitor and control the objects of the SAN. One solution to this is to use special software provided by EMC Corporation of Hopkinton, Mass. for monitoring and controlling the objects. The EMC software runs on one or more hosts to monitor the SAN. The software also includes agents, which are separate programs that collect data from each of the objects of the SAN and report back to the EMC software running on the one or more hosts. The agents gather SAN information that is stored as records in a database.

In some instances, the total amount of data corresponding to a particular system parameter may constitute thousands of records. When a user requests the data, the system fetches all of the records, even if the user is interested in viewing only a small percentage of the records. Systems exist which allow a user to fetch a percentage of records of a database. However, those systems also provide additional commands/functionality to allow a user to indicate which portion of the database is of interest. Accordingly, it would be useful to be able to obtain only those records in which a user is interested without having to add additional complexity to the system.

SUMMARY OF THE INVENTION

According to the present invention, displaying requested data from a database includes providing a display containing a scroll bar with a scroll tab therein, determining a total amount of the requested data, sizing the scroll tab in the scroll bar according to the total amount of the requested data and according to an amount of data displayable in the display, and fetching a predetermined amount of data from a first portion of the database, where the predetermined amount is independent of the size of the display and where the predetermined amount is less than the total amount of the requested data. Sizing the scroll tab may include choosing a size that indicates to a user that all of the requested data is being fetched from the database and/or may include choosing a size that is inversely proportional to the total amount of the request data in response to the total amount of the requested data being less than a predetermined value. Choosing a size may include choosing a predetermined size in response to the total amount of the requested data being greater than the predetermined value. Displaying requested data from a database may also include fetching the predetermined amount of data from a second portion of the database in response to a user moving the scroll tab in the scroll bar. The predetermined amount may correspond to seventy-five records of data. The seventy-five records of data may be the first seventy-five records of data in the database in response to the scroll tab being at the top of the scroll bar. The seventy-five records of data may be the last seventy-five records of data in the database in response to the scroll tab being at the top of the scroll bar. The seventy-five records of data may include seventy-three records of data after a location indicated by the scroll tab and two records of data before the location indicated by the scroll tab in response to the scroll tab being in the middle of the scroll bar.

According further to the present invention, computer software that displays requested data from a database includes executable code that provides a display containing a scroll bar with a scroll tab therein, executable code that determines a total amount of the requested data, executable code that sizes the scroll tab in the scroll bar according to the total amount of the requested data and according to an amount of data displayable in the display, and executable code that fetches a predetermined amount of data from a first portion of the database, where the predetermined amount is independent of the size of the display and where the predetermined amount is less than the total amount of the requested data. Executable code that sizes the scroll tab may include executable code that chooses a size that indicates to a user that all of the requested data is being fetched from the database. Executable code that sizes the scroll tab may include executable code that chooses a size that is inversely proportional to the total amount of the request data in response to the total amount of the requested data being less than a predetermined value. Executable code that chooses a size may include executable code that chooses a predetermined size in response to the total amount of the requested data being greater than the predetermined value. The computer software may also include executable code that fetches the predetermined amount of data from a second portion of the database in response to a user moving the scroll tab in the scroll bar. The predetermined amount may correspond to seventy-five records of data. The seventy-five records of data may be the first seventy-five records of data in the database in response to the scroll tab being at the top of the scroll bar. The seventy-five records of data may be the last seventy-five records of data in the database in response to the scroll tab being at the top of the scroll bar. The seventy-five records of data may include seventy-three records of data after a location indicated by the scroll tab and two records of data before the location indicated by the scroll tab in response to the scroll tab being in the middle of the scroll bar. The executable code that provides a display may be separate from the executable code that fetches. The executable code that provides a display may run on a different host processor from the executable code that fetches.

DETAILED DESCRIPTION OF VARIOUS EMBODIMENTS

Figure 1:
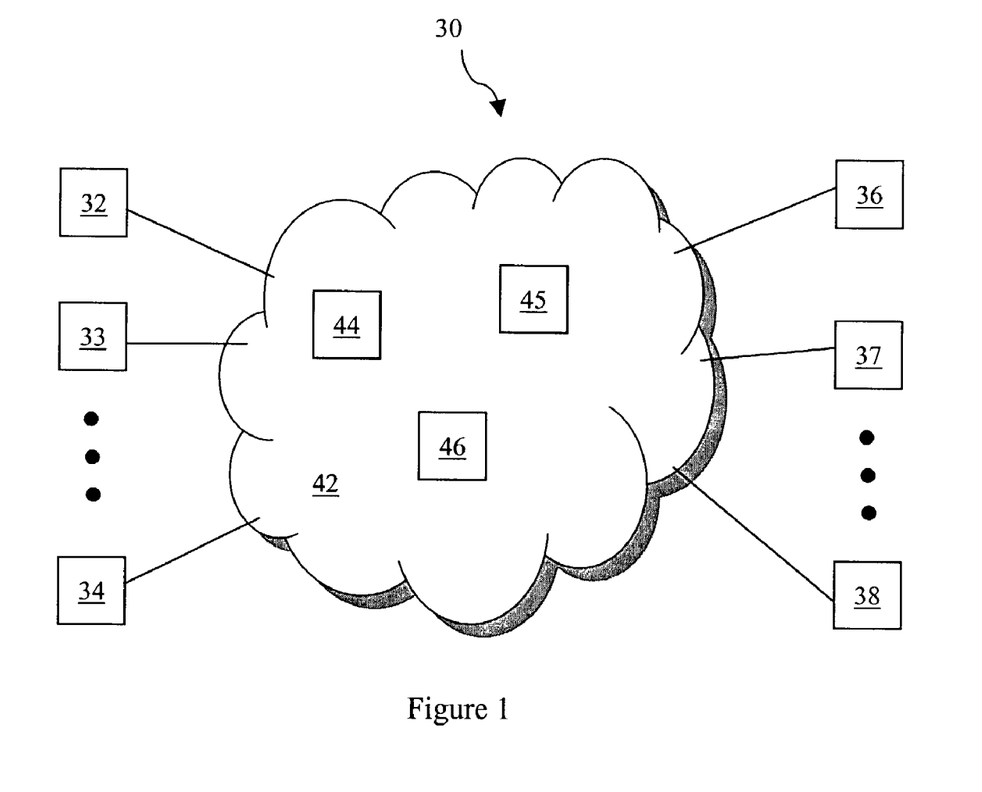
FIG. 1 is a diagram illustrating a storage area network (SAN) that contains a plurality of hosts, a plurality of storage devices, and a plurality of switches according to the system described herein.

Referring to FIG. 1, storage area network (SAN) 30 includes a plurality of hosts 32-34, coupled to a plurality of storage devices 36-38 via a SAN fabric 42. The SAN fabric 42 may include a plurality of switches 44-46 that switch data between the hosts 32-34 and the storage devices 36-38. The SAN fabric 42 may connect one or more of the hosts 32-34 to one or more of the storage devices 36-38 via one or more of the switches 44-46. A system for monitoring and configuring a SAN 30 is disclosed, for example, in U.S. patent application Ser. No. 09/431,758 filed on Nov. 1, 1999, which is incorporated by reference herein. The following discussion relates to that type of system that may be used in conjunction with, or as a supplement to, the system disclosed in U.S. patent application Ser. No. 09/431,758.

It is possible to have a program running on one or more of the hosts 32-34 to monitor operation of one or more objects that are components of the SAN 30, such as the hosts 32-34, the storage devices 36-38, and/or the switches 44-46. The program includes subprograms/tasks called "agents", which run independently to monitor information on an object (e.g., one of the storage devices 36-38, one of the switches 44-46, one of the hosts 32-34, etc.) and transfer data about the objects as well as receive data indicating what should be monitored and how often. Each agent is written specifically for the type of object it monitors and the data it collects. However, as explained in detail elsewhere herein, it is possible to generically specify the data collection policies (object/frequency/type of data) for the agents. In some cases, the agents may have been provided with built in data collection policies which may be either overridden or "merged" (described below) with the generically specified and dynamic data collection policies described herein.

Figure 2:
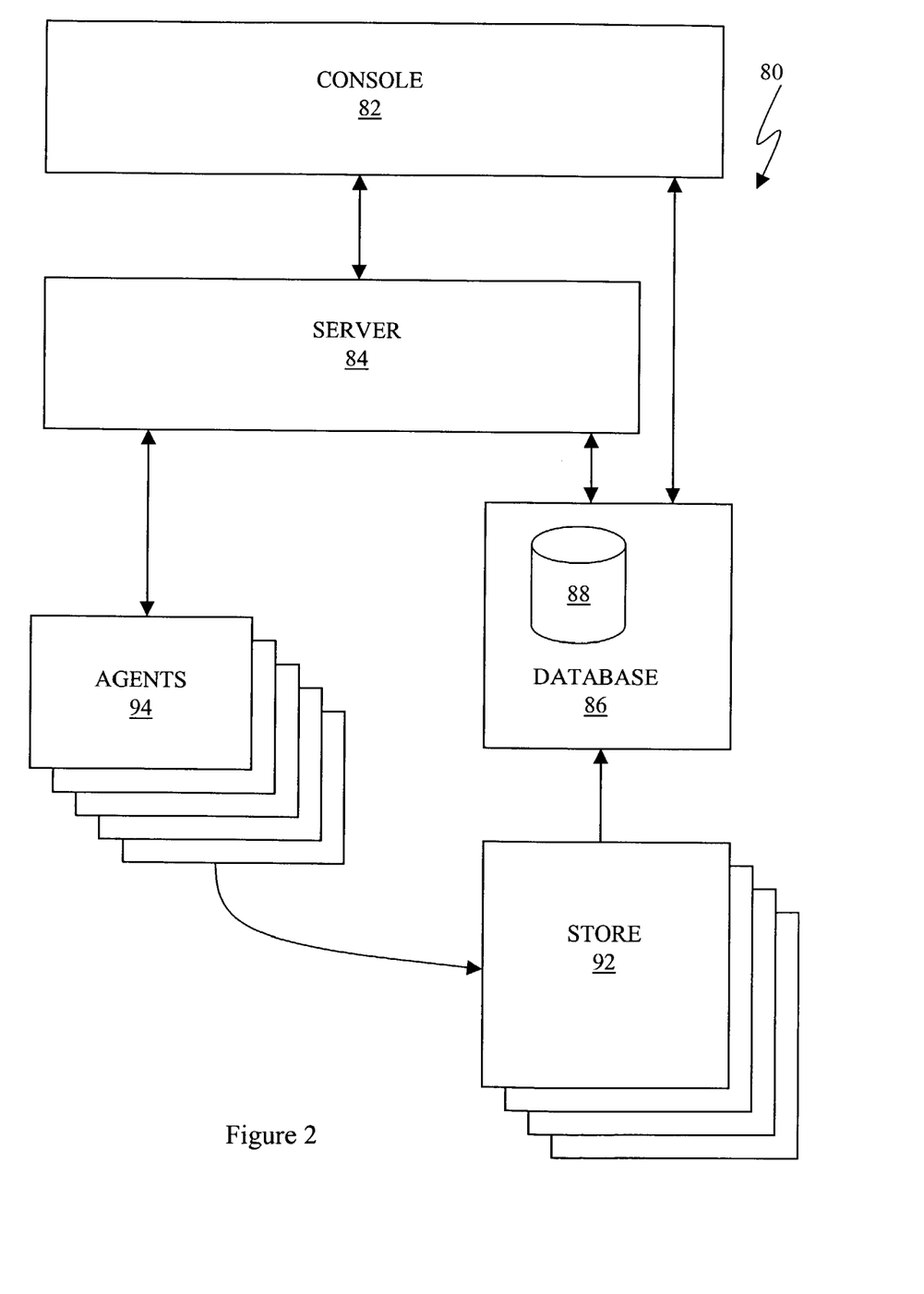
FIG. 2 is a block diagram illustrating a relationship between portions of a program used to monitor and control operation of a SAN according to the system described herein.

Referring to FIG. 2, a diagram 80 illustrates a structure of a program to monitor and control objects associated with a storage area network. The program includes a console module 82, a server module 84, and a database module 86 that contains a data element 88. The program also includes a plurality of store modules 92 and a plurality of agents 94. Each of the modules 82, 84, 86, 92, 94 may or may not reside on the same or different objects associated with the storage area network. The console 82, the server 84, the database 86, and the store modules 92 may reside on one or more hosts. Each of the agents 94 may reside on the particular object for which the agent is responsible or, in some instances, may reside on an object where the agent has appropriate access to the data being collected for the object. For example, an agent collecting data related to a particular storage device may reside on a host coupled to that storage device provided that the agent is able to obtain the information that it needs about the storage device from the host.

The interconnections between the modules 82, 84, 86, 92, 94 illustrate data paths therebetween. Thus, for example, there is a two-way data path between the console 82 and the server 84. As described elsewhere herein, in some instances it may not be necessary for a data path to be persistent, provided that the data path is available when data needs to be communicated. In some instances, data needs to be communicated at certain times and not at others.

The console 82 represents the portion of the program that interacts with a user. Thus, the console 82 provides all of the screens and menus to the user described herein. The console 82 also receives input from the user who makes selections and/or edits as described elsewhere herein. Thus the console 82 is, in effect, the user interface for the remainder of the program. The console 82 may be implemented using Java and standard system calls to provide the user interface.

The database 86 includes the data 88 that represents data collected by the agents 94 and perhaps other data. In other embodiments, the data 88 may be stored separate or partially separate from the database 86. The data 88 may also be distributed among more than one host and/or other device. Note that the database 86, the server 84, and the console 82 may be on different hosts or may be on the same host, or some combination thereof.

In some embodiments, the agents 94 poll the server 84 prior to each collection of data. The server 84 indicates to the agents 94 the identity of the a particular one of the store modules 92 to which the data should be provided by the agents 94. In some embodiments, there may be only one store module which may be used to receive data from the agents 94. The server 84 may select the particular one of the store modules 92 based on a variety of functional factors obvious to one skilled in the art, such as load balancing. The store modules 92 may then transfer the collected data to the database 86.

Figure 3:
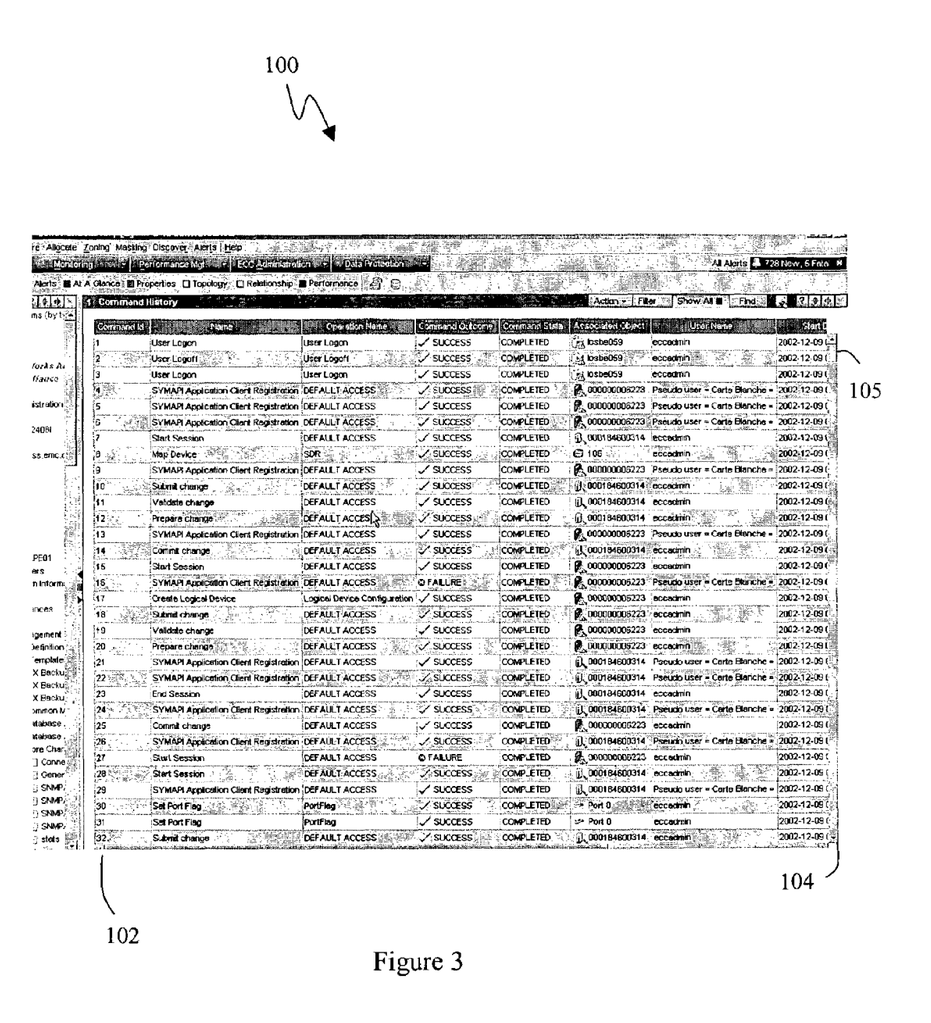
FIG. 3 is a screen display showing an aspect of using a program to monitor and control a SAN according to the system described herein.

Referring to FIG. 3, a screen 100 is provided by the console 82 to a user that requests a view of some of the data 88 in the database 86. The data is provided by the database 86 through the server 84 to the console 82 and displayed to the user. The screen 100 includes a record number field 102 and a scroll bar 104 with a scroll tab 105. In the embodiment illustrated in FIG. 3, each record corresponds to a line. However, in other embodiments, it is possible for a record to correspond to more than one display line and/or for a display line to correspond to more than one record.

In some instances, the amount of data requested by the user may be significantly more data than fits on the screen. For example, for the screen 100, there may be ten thousand possible records and thus ten thousand possible values in the record number field 102. The user may experience a significant delay if all ten thousand records were provided by the database 86 to the console 82 either through the server 84 or even from the database 86 directly to the console 82. In addition, the user may only desire to view a very small percentage of those records before moving on to a different set of records or terminating the session altogether. In some cases, the user may not know (or care) that he has posed a query that requires a large amount of data, but the user may not appreciate the significant delay such a request could cause and may not appreciate the adverse effects created by flooding the console with data. The system described herein addresses these issues by only reading in a percentage of the total data into the console 82 while configuring the screen 100 to appear to the user that all of the records are available for viewing. Thus, the user does not need to worry or care how much data may be associated with a particular query because the system provides appropriate management of the data without requiring significant knowledge or intervention by the user. In addition, the amount of space needed by the console 82 may be reduced. This is described in more detail below.

Figure 4:
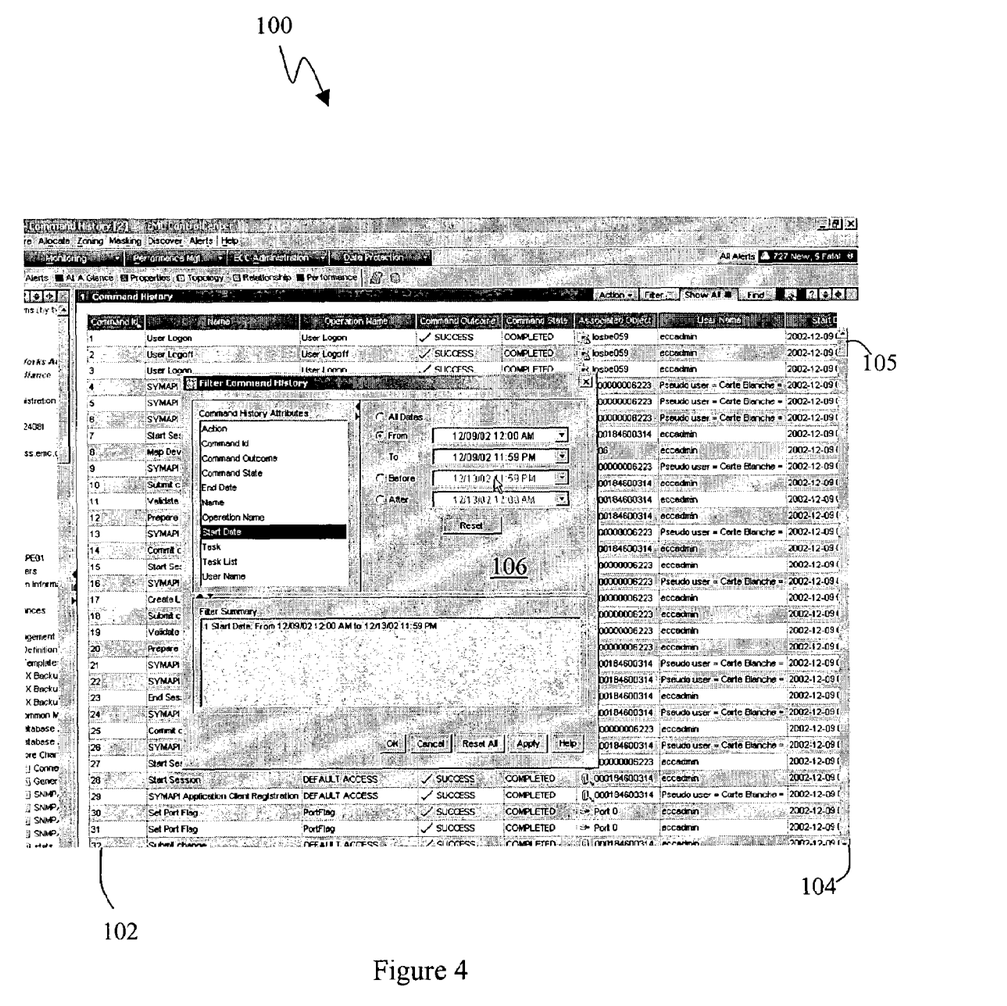
FIG. 4 is a screen display showing an aspect of using a program to monitor and control a SAN according to the system described herein.

Referring to FIG. 4, the screen 100 is shown as including a dialogue box 106 that allows a user to filter data that is viewed according to parameters specified in the dialog box 106. The user enters commands and information into the dialogue box 106 and selects the OK button.

Figure 5:
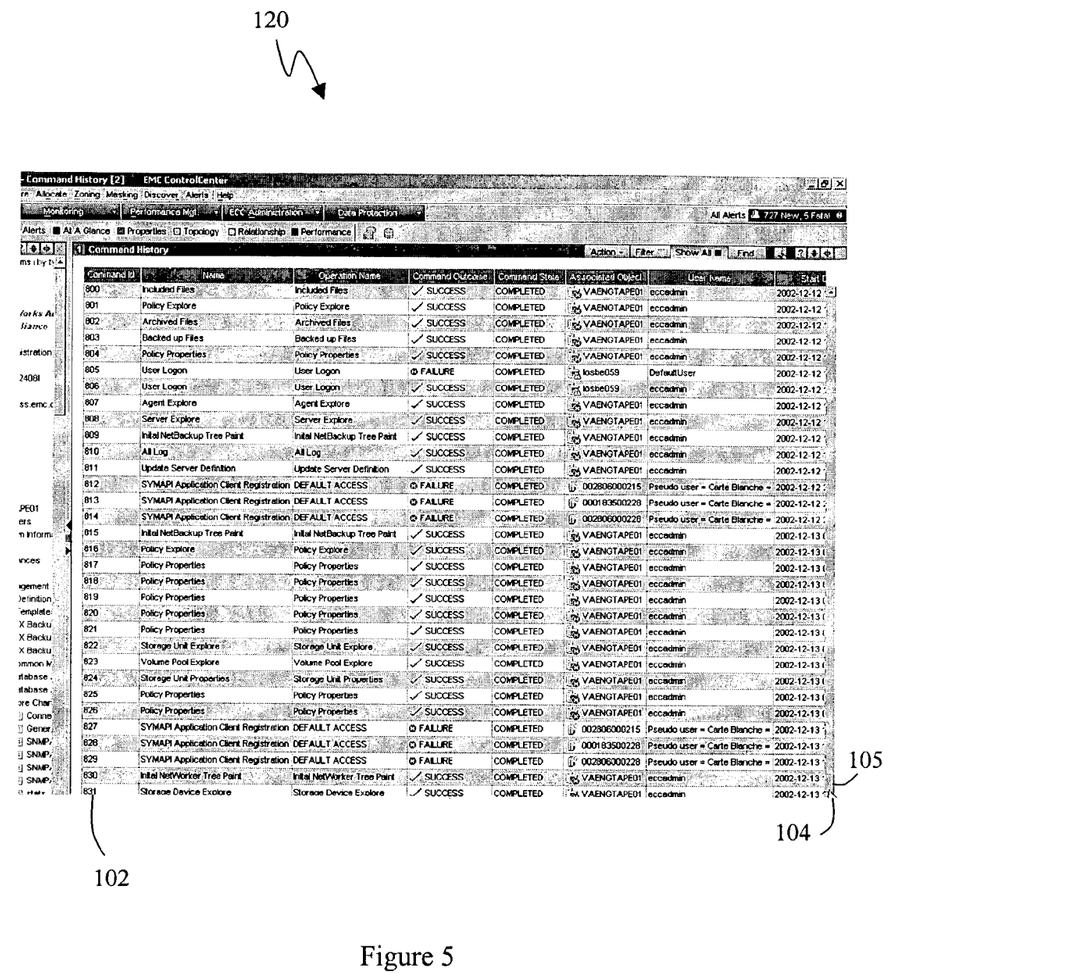
FIG. 5 is a screen display showing an aspect of using a program to monitor and control a SAN according to the system described herein.

Referring to FIG. 5, a new screen 120 illustrates the results of selecting the OK button in the dialogue box 106 of FIG. 4. The new screen 120 also has the record number field 102, the scroll bar 104, and the scroll tab 105. However, the screen 120 shows a different view of the data that results from performing the selection indicated in the dialogue box 106. The data shown in the screen 120 was not present in the console 82 while the user was viewing the screen 100. However, the console 82 presents the screen 120 by requesting new data from the data base 86 (either through the server 84 or directly), as described below.

Figure 6:
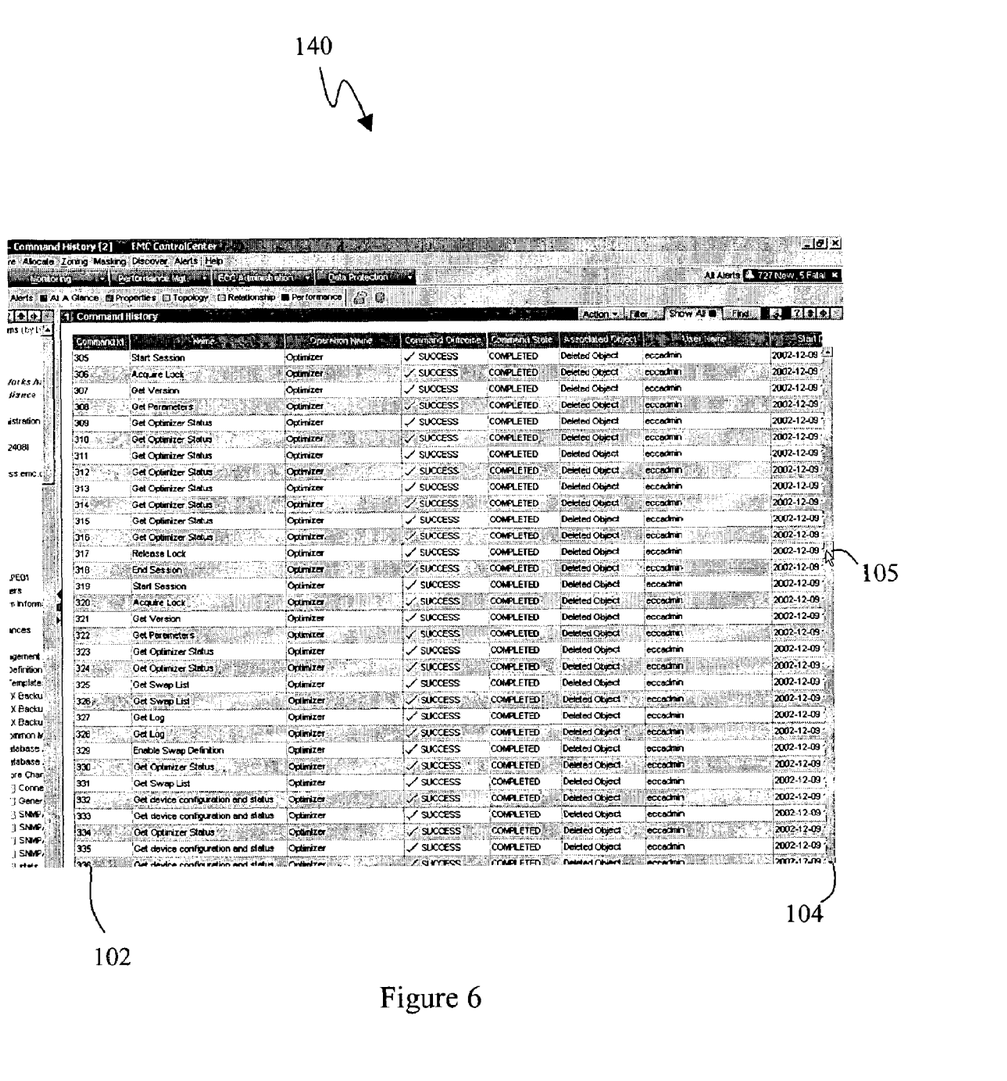
FIG. 6 is a screen display showing an aspect of using a program to monitor and control a SAN according to the system described herein.

Referring to FIG. 6, a screen 140 shows the result of moving the scroll tab 105 to a different position. The data that is being viewed on the screen 140 represents records at approximately the midpoint of the total number of records stored in the database, as indicated by the position of the scroll tab 105 in the scroll bar 104. When the user moves the scroll tab 105, the system waits for the user to release the mouse button to set the scroll tab 105 in place. Then, the appropriate data is presented to the user. This is described in more detail below.

Figure 7:
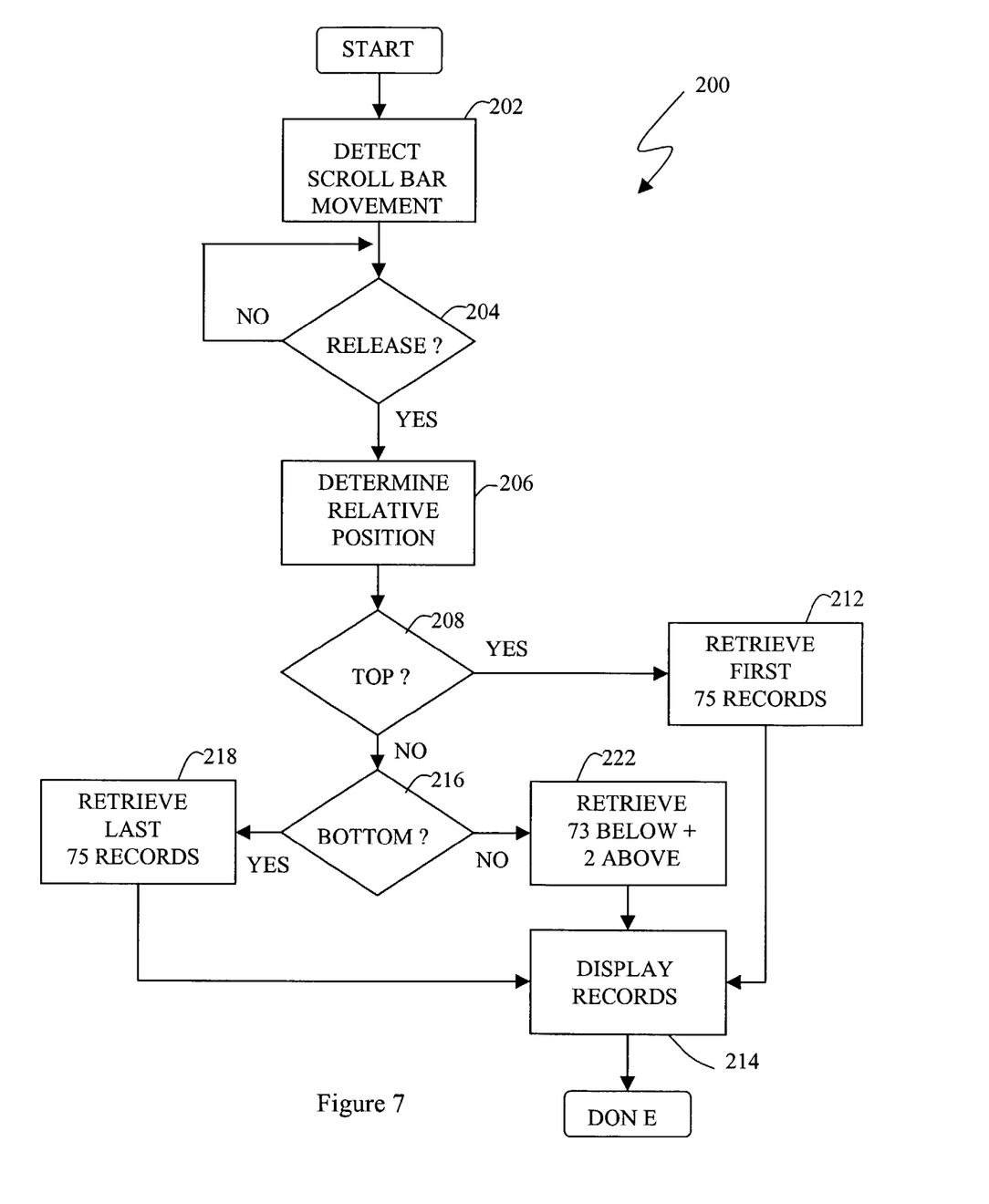
FIG. 7 is a flow chart illustrating moving a thumb wheel for a display portion of a program used to monitor and control operation of a SAN according to the system described herein.

Referring to FIG. 7, a flow chart 200 illustrates steps performed in connection with the user moving the scroll tab 105 of the scroll bar 104 using the mouse. Processing begins at a first step 202, which determines that scroll tab movement is present. Following the step 202 is a test step 204 which determines if the user has released the scroll tab (i.e., released the mouse button). If not, then control passes back to the step 204 to essentially poll until the user releases the mouse button. Once it is determined at the test step 204 that the user has released the scroll tab (mouse button), control passes from the step 204 to a step 206 where the relative position of the scroll tab in the scroll bar is determined. Note that, for example, if the scroll tab is placed in the middle of the scroll bar, then the records from approximately the middle of the total number of records stored in the database would be retrieved and presented to the user. Similarly, if the scroll tab is placed at the top of the scroll bar, the records from the beginning of the records stored in the database are retrieved and presented to the user. Following the step 206 is a test step 208 which determines if the scroll tab has been placed at the top of the scroll bar.

If it is determined at the test step 208 that the scroll tab has been placed at the top of the scroll bar, then control passes from the step 208 to a step 212, where seventy-five records at the beginning of the database are retrieved. The software for retrieving the records from the database uses the TopLink product provided by Oracle Corporation. Thus, records may be retrieved from a database by making appropriate calls and using appropriate parameters in connection with the TopLink product. In some instances, the TopLink product provides caching that is useful to the operation of the system described herein. The data may be retrieved either through the server 84 or directly from the database 86.

Following the step 212 is a step 214 where the records are displayed to the user. Note that, depending on the size and configuration of the display, not all seventy-five records that are retrieved at the step 212 may be displayed at the step 214. However, in an embodiment herein, seventy-five records are fetched irrespective of the size and configuration of the display. Having the amount of data being fetched from the database be independent of the size and configuration of the display has been found to be advantageous, even though, in some cases, more data is being fetched than can be displayed in one screen. Following the step 214, processing is complete.

If it is determined at the test step 208 that the scroll tab has not been placed at the top of the scroll bar, then control passes from the step 208 to a test step 216 which determines if the scroll tab has been placed at the bottom of the scroll bar. If so, then control passes from the step 216 to a step 218, where seventy-five records at the bottom (end) of the total records stored in the database are retrieved. Following the step 218 is the step 214 where the records are displayed to the user. Following the step 214, processing is complete.

If it is determined at the test step 216 that the scroll tab has not been placed at the bottom of the scroll bar, then control transfers from the step 216 to a step 222 where the seventy-three records below (after) the location indicated by the scroll tab are retrieved as well as two records above (before) the location indicated by the scroll tab. Retrieving most of the records below (after) the location indicated by the scroll tab is useful because it has been determined that a user is more likely to scroll down rather than up. Following the step 222 is the step 214, discussed above. Note that it is possible to practice the invention with any number of records (i.e., a number other than seventy-five) being fetched from the top, bottom, and middle of the database.

Figure 8:
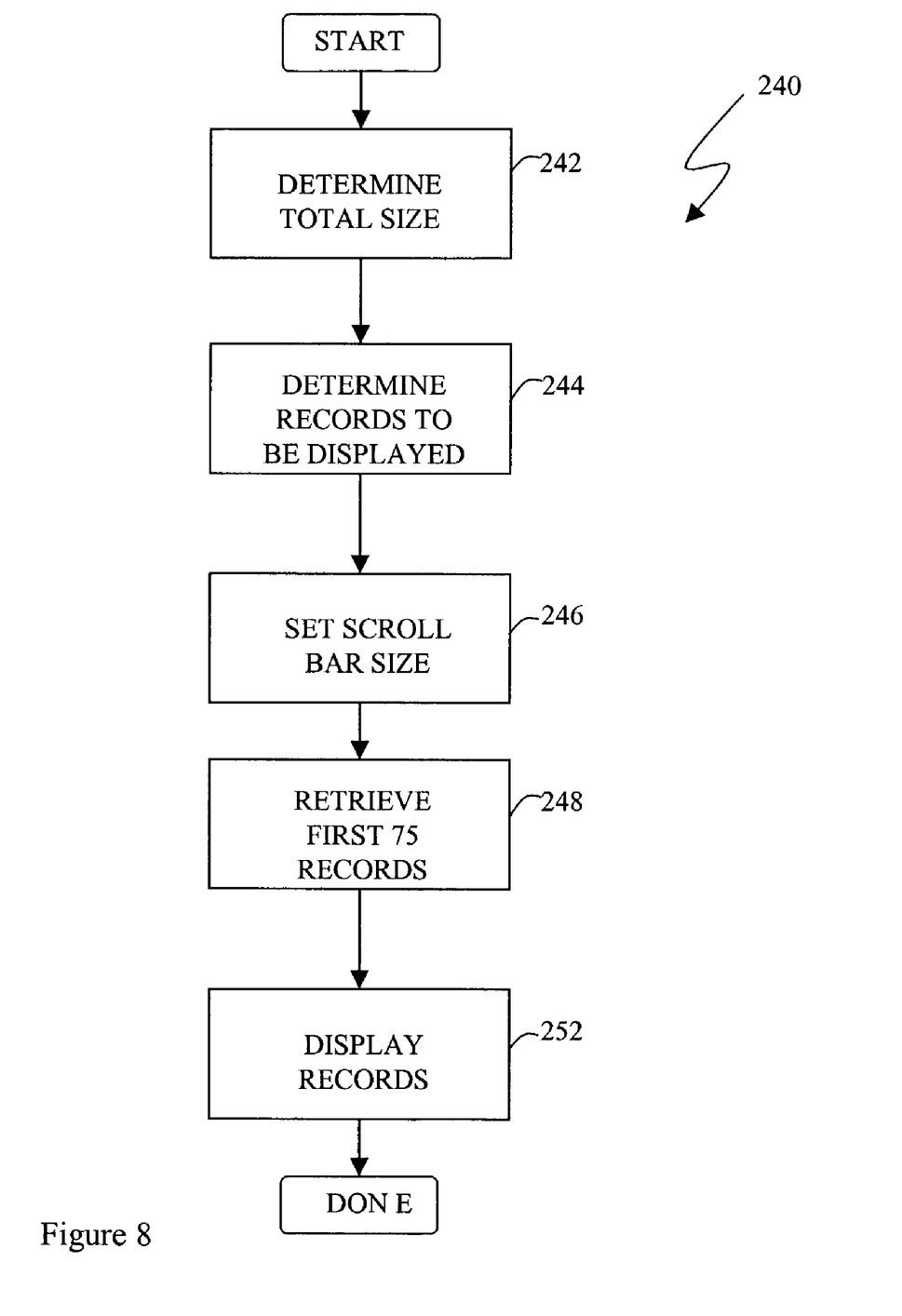
FIG. 8 is a flow chart illustrating initializing a display portion of a program used to monitor and control operation of a SAN according to the system described herein.

Referring to FIG. 8, a flow chart 240 illustrates steps performed in connection with initializing a view of a portion of a database and a corresponding screen selected by a user. Processing begins at a first step 242 where the total size of the database being viewed (i.e., total number of records) is determined. Determining the total size of the database at the step 242 may be performed by performing a query to the database to return the total number of records using, for example, the TopLink software, discussed elsewhere herein. In some embodiments, it is possible to provide the user with a visual indicator showing the total number of records.

Following step 242 is a step 244 where it is determined how many records may be displayed on the screen at one time. Note that the number of records that may be displayed on a screen at one time depends on a variety of factors, including the screen size and configuration of the system.

Following step 244 is a step 246 where the scroll tab size is determined. The scroll tab size is a function of the total amount of data and the amount of data that may be displayed by the screen. Thus, for example, if one half of the data may be displayed on the screen at any one time (e.g., thirty records are displayed in a sixty record data base), then the scroll tab would be approximately one half of the size of the scroll bar. Generally, the size of the scroll tab may be inversely proportional to the total amount of the requested data. Note, however, that the scroll tab may not be allowed to be reduced below a certain minimum size even for very large databases so that, for example, a user may still be able to see the scroll tab and be able to access the scroll tab with a mouse.

Following the step 246 is a step 248 where the first seventy-five records of the database are retrieved in a manner similar to that discussed above in connection with the step 212 of the flow chart 200 of FIG. 7. Following the step 248 is a step 252 where the records are displayed. As discussed above, depending on the screen size and configuration of the system, it is possible that not all seventy-five records retrieved at the step 248 are displayed at the step 252. Following the step 252, processing is complete.

While the invention has been disclosed in connection with various embodiments, modifications thereon will be readily apparent to those skilled in the art. Accordingly, the spirit and scope of the invention is set forth in the following claims.

What is claimed is:

1. A method of displaying requested data from a database, comprising:
   providing a display containing a scroll bar with a scroll tab therein;
   determining a total amount of the requested data;
   sizing the scroll tab in the scroll bar to a size according to the total amount of the requested data and according to an amount of data displayable in the display; and
   fetching a predetermined amount of data from a first portion of the database, wherein the predetermined amount is independent of a size of the display and the size of the scroll tab, wherein the predetermined amount is less than the total amount of the requested data, and wherein at least a first subset of the predetermined amount of data fetched from the database is displayed on the display and at least a second subset of the predetermined amount of data fetched from the database, different from the first subset, is displayable on the display in response to movement of the scroll tab.

2. A method, according to claim 1, wherein sizing the scroll tab includes choosing a size that indicates to a user that all of the requested data is being fetched from the database.

3. A method, according to claim 2, wherein sizing the scroll tab includes choosing a size that is inversely proportional to the total amount of the request data in response to the total amount of the requested data being less than a predetermined value.

4. A method, according to claim 3, wherein choosing a size includes choosing a predetermined size in response to the total amount of the requested data being greater than the predetermined value.

5. A method, according to claim 1, further comprising:
   fetching the predetermined amount of data from a second portion of the database in response to a user moving the scroll tab in the scroll bar.

6. A method, according to claim 1, wherein the predetermined amount corresponds to seventy-five records of data.

7. A method, according to claim 6, wherein the seventy-five records of data are the first seventy-five records of data in the database in response to the scroll tab being at the top of the scroll bar.

8. A method, according to claim 7, wherein the seventy-five records of data are the last seventy-five records of data in the database in response to the scroll tab being at the top of the scroll bar.

9. A method, according to claim 8, wherein the seventy-five records of data include seventy-three records of data after a location indicated by the scroll tab and two records of data before the location indicated by the scroll tab in response to the scroll tab being in the middle of the scroll bar.

10. The method according to claim 1, wherein a range of the predetermined amount of data fetched from the first portion of the database is determined based on a location of the scroll tab within the scroll bar.

11. The method according to claim 10, wherein if said scroll tab is at a location other than the top of the scroll bar and the bottom of the scroll bar, said range includes at least some data of the predetermined amount that is stored positionally before data displayed in the display and at least some data of the predetermined amount of data that is stored positionally after the data displayed in the display.

12. Computer software, stored in a computer-readable medium, that displays requested data from a database, comprising:
   executable code that provides a display containing a scroll bar with a scroll tab therein;
   executable code that determines a total amount of the requested data;
   executable code that sizes the scroll tab in the scroll bar to a size according to the total amount of the requested data and according to an amount of data displayable in the display; and
   executable code that fetches a predetermined amount of data from a first portion of the database, wherein the predetermined amount is independent of a size of the display and the size of the scroll tab, wherein the predetermined amount is less than the total amount of the requested data, and wherein at least a first subset of the predetermined amount of data fetched from the database is displayed on the display and at least a second subset of the predetermined amount of data fetched from the database, different from the first subset, is displayable on the display in response to movement of the scroll tab.

13. Computer software, according to claim 12, wherein executable code that sizes the scroll tab includes executable code that chooses a size that indicates to a user that all of the requested data is being fetched from the database.

14. Computer software, according to claim 13, wherein executable code that sizes the scroll tab includes executable code that chooses a size that is inversely proportional to the total amount of the request data in response to the total amount of the requested data being less than a predetermined value.

15. Computer software, according to claim 14, wherein executable code that chooses a size includes executable code that chooses a predetermined size in response to the total amount of the requested data being greater than the predetermined value.

16. Computer software, according to claim 12, further comprising:
   executable code that fetches the predetermined amount of data from a second portion of the database in response to a user moving the scroll tab in the scroll bar.

17. Computer software, according to claim 12, wherein the predetermined amount corresponds to seventy-five records of data.

18. Computer software, according to claim 17, wherein the seventy-five records of data are the first seventy-five records of data in the database in response to the scroll tab being at the top of the scroll bar.

19. Computer software, according to claim 18, wherein the seventy-five records of data are the last seventy-five records of data in the database in response to the scroll tab being at the top of the scroll bar.

20. Computer software, according to claim 19, wherein the seventy-five records of data include seventy-three records of data after a location indicated by the scroll tab and two records of data before the location indicated by the scroll tab in response to the scroll tab being in the middle of the scroll bar.

21. Computer software, according to claim 12, wherein the executable code that provides a display is separate from the executable code that fetches.

22. Computer software, according to claim 21, wherein the executable code that provides a display runs on a different host processor from the executable code that fetches.

23. The computer software according to claim 12, wherein a range of the predetermined amount of data fetched from the first portion of the database is determined based on a location of the scroll tab within the scroll bar.

24. The computer software according to claim 23, wherein if said scroll tab is at a location other than the top of the scroll bar and the bottom of the scroll bar, said range includes at least some data of the predetermined amount that is stored positionally before data displayed in the display and at least some data of the predetermined amount of data that is stored positionally after the data displayed in the display.

* * * * *